Oct. 28, 1969  E. E. JEFFERY, SR  3,475,101
OPTICAL PLUMB INCLUDING MEANS TO LEVEL
Filed March 14, 1966  2 Sheets-Sheet 1
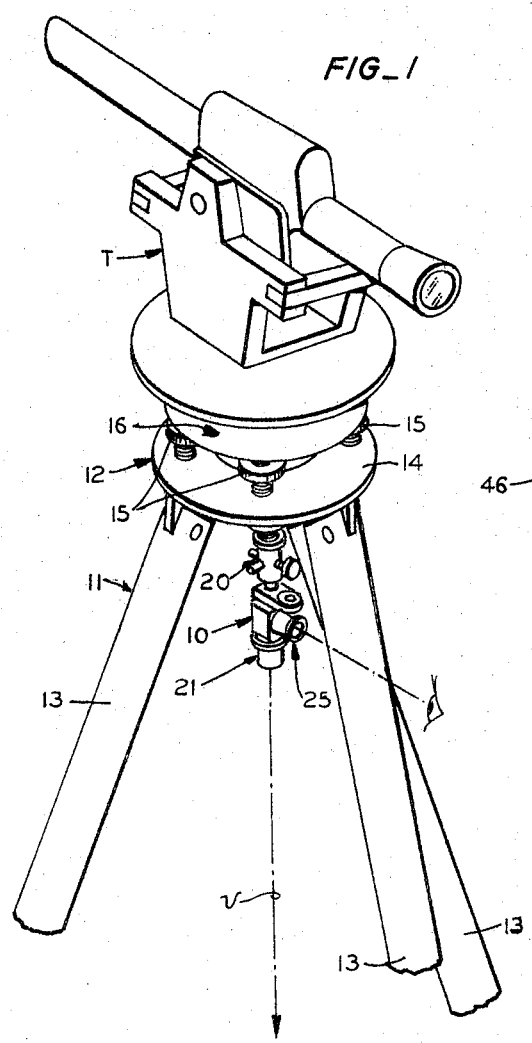
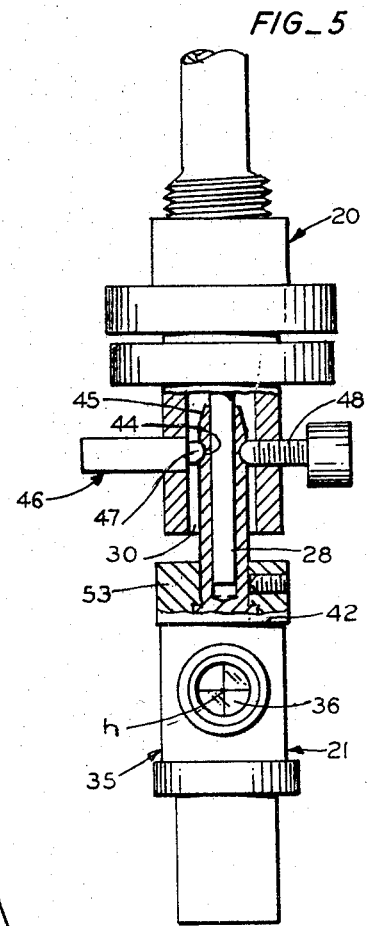
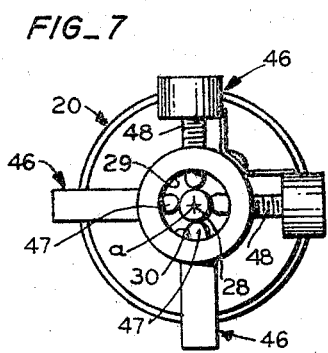
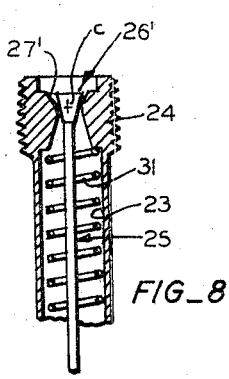
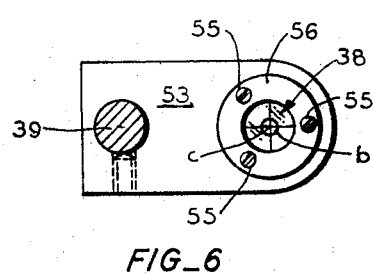
INVENTOR.
ELTON E. JEFFERY, SR.
BY Hansen and Lane
HIS ATTORNEYS Oct. 28, 1969    E. E. JEFFERY, SR    3,475,101
OPTICAL PLUMB INCLUDING MEANS TO LEVEL
Filed March 14, 1966    2 Sheets-Sheet 2
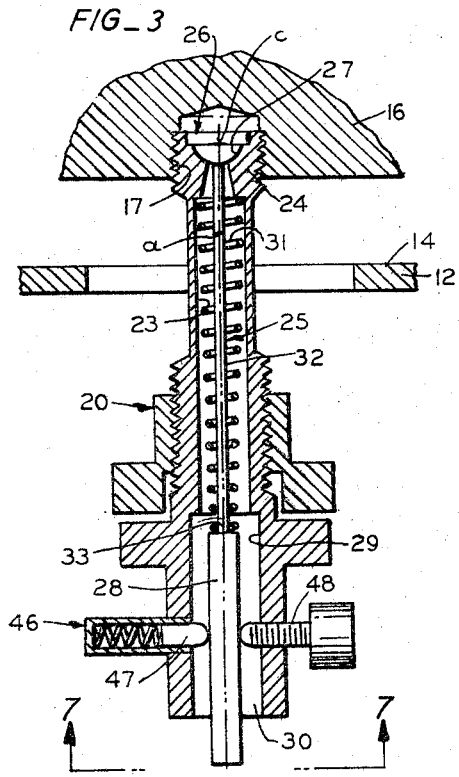
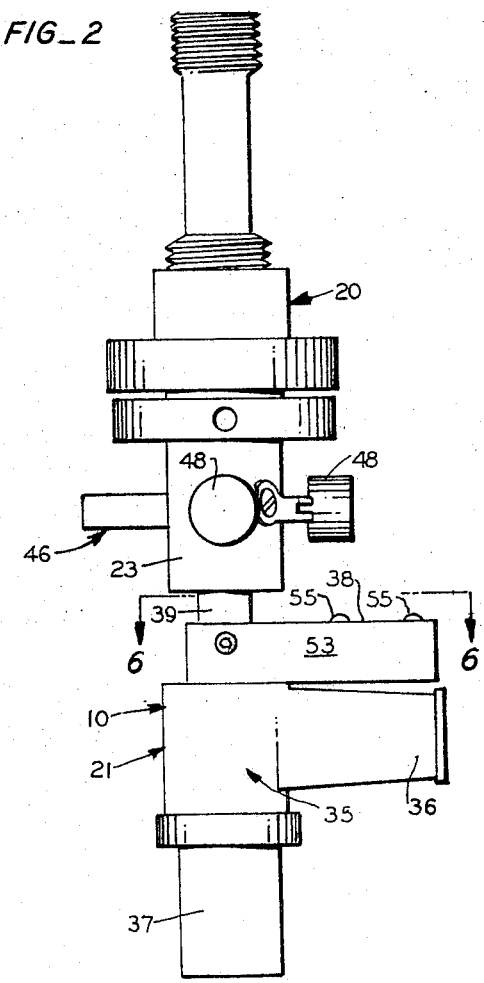
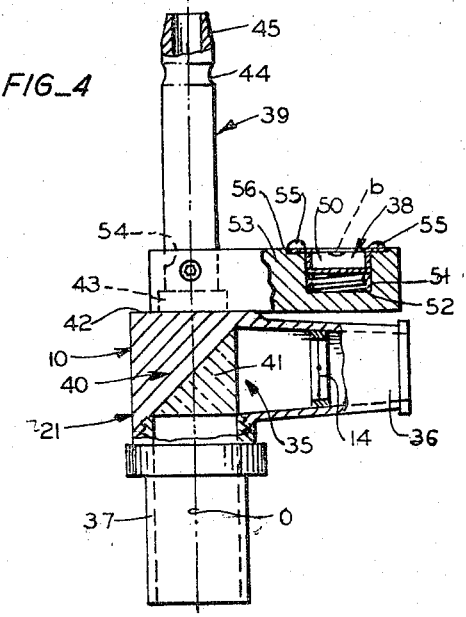
INVENTOR.
ELTON E. JEFFERY, SR.
BY
Hansen and Lane
HIS ATTORNEYS

United States Patent Office 3,475,101
Patented Oct. 28, 1969

3,475,101
OPTICAL PLUMB INCLUDING MEANS TO LEVEL
Elton E. Jeffery, Sr., 14486 Oak Place,
Saratoga, Calif. 95070
Filed Mar. 14, 1966, Ser. No. 534,037
Int. Cl. G01b *1/00;* G01c *21/06, 15/00*
U.S. Cl. 356—150                                6 Claims

ABSTRACT OF THE DISCLOSURE

An optical plumb detachably mounted on a swinging mount swivelly connected at center of the levelable base of a tripod supported instrument for sighting and establishing true vertical of such base center above a centering location mark on the surface supporting the tripod.

---

The present invention relates to an optical plumb and is primarily for the purpose of replacing a plumb bob or other such structural means for establishing true vertical.

As is well known, a conventional plumb bob consisting of a centering weight suspended on a cord tends to swing until settled. Moreover, during windy weather, the weight and cord tend to sway with the wind thus disturbing their vertical disposition. Other forms of devices such as rigid rods have been proposed to alleviate this difficulty. Such rigid rods are unwieldly and create greater problems in both handling and use.

The present invention contemplates the provision of an optical plumb wherein no mechansm other than a sighting device is employed. Moreover, the present invention embraces the provision of an optical plumb adapted for use on existing instruments as well as new instruments such as transits, levels, plane tables, surveying instruments and the like. It further contemplates the provision of an adapter constructed for attachment to such instruments and means for detachably mounting the optical system on such adapter for establishing true vertical in relation to the instrument.

In connection with the foregoing it will be appreciated that although the instant invention is particularly useful with a theodolite it is equally useful in conjunction with a flag or target mounted on a tripod for positioning such target vertically above a stake or point or bench-mark from and to which other points are to be located and/or measured.

It is accordingly another object of the present invention to provide an adapter including a mounting pin suspended from a head centered at the baseline of a surveying instrument or the like and adapted to receive an optical scope and means for accurately aligning the same with such mounting pin for optically plumbing the instrument center relative to the instrument base center and a mark, stake or point at earth's level or some surface thereof below the instrument.

These and other objects and advantages of the present invention will become apparent from a reading of the following description and claims in the light of the accompanying drawing in which:

FIG. 1 is a perspective view of the upper end of a tripod supporting a theodolite on a base having the optical plumb of the present invention associated therewith.

FIG. 2 is a side elevational view of the optical plumb of FIG. 1 and at a larger scale with respect thereto.

FIG. 3 is a vertical section through the adapter unit of the present invention.

FIG. 4 is a side elevation partially broken away and in section to illustrate the optical unit embodied in the instant invention.

FIG. 5 is an assembly elevation as seen from the right-hand side of FIG. 2 and partially in section.

FIG. 6 is a horizontal section through FIG. 2 taken along line 6—6 thereof.

FIG. 7 is a bottom plan view of FIG. 3.

FIG. 8 is a fragmentary section illustrating a modified form of the upper end of the adapter shown in FIG. 3.

Referring to FIG. 1 of the drawing, an optical plumb generally designated 10 is shown in situ on a surveying instrument 11. Briefly, the instrument 11 consists of a tripod 12 having each of its three legs 13 hingedly connected to a plate 14 for setting the same vertically above a benchmark, nail or stake in the usual manner.

The plate 14 is provided with leveling screws 15 associated with a base 16 which usually is found on most theodolites T or it may be the base for a flag, target, or other such marker to be sighted by the telescope of another theodolite. At all events it is the usual practice to locate center C of the base 16 vertically above the nail, bench-mark or other such mark or to locate the position the latter is to assume once the surveyor has accurately established all levels and readings on his instrument. For this purpose most instruments have a threaded bore 17 at center C of the base 16 to receive a plug having a hook or eye (not shown) from which a plumb line with plumb bob thereon can be pendently suspended.

The optical plumb 10 is so constructed as to be readily substituted for previously known plumb lines or rods.

In general the optical plumb 10 of the present invention consists of an adapter 20 and an optical unit 21 detachably related to one another. The adapter 20 is constructed for connection to the base 16 of the instrument and may be or may become a permanent part thereof. The optical unit 21 which embodies more expensive components and workmanship, is constructed to fit the adapter 20 and to be removable therefrom, once the base 16 of the tripod 12 has been accurately centered above a mark or stake. Thus a tripod can be accurately placed and a target set thereon while the theodolite as well as the optical unit removed therefrom can be used on another tripod at the next location.

Refrering to FIG. 3, the adapter 20 comprises a tubular housing 23 having a threaded upper end 24 adapted to fit the threading in the threaded bore 17 of the base 16. The tubular housing should therefore extend with its axis *a* normal to the horizontal base 16 which for all practical purposes should be level. However, due to discrepancies in machining it is impossible to have all tubular housings fit alike at absolute normal to the base.

Within the tubular housing 23 is a mounting spindle 25 having its upper end 26 swivelly mounted within the upper end 24 of the housing 23. The swivel mounting 26 is shown as a sphere or half ball in FIGS. 3 and 5 and in FIG. 8, a modified form is shown as a frusto conical head 26' on the spindle 25. In either case the head 26 or 26' is disposed in a seat 27 or 27' respectively, formed in the upper end of the housing 23 to swivelly support the mounting spindle for swinging movement about a center which coincides with the center C of the base 16. The inner surface of the tubular housing 23 is flared from the seat 27 and 27', respectively, to permit the spindle to swing about its swivel mounting and relative to the axis *a* of the tubular housing 23.

The lower end of the spindle 25 has an enlarged mounting portion 28 disposed within a larger sleeve-like bore 29 at the open lower end 30 of the housing 23. A compression spring 31 circumscribes the narrower shank portion 32 of the spindle 25 and has its upper end bearing against the upper end 24 of the housing. The spring 31 is helically coiled about the shank portion 32 and has its reduced lower end disposed upon the shoulder 33 provided at the juncture of the shank portion with the enlarged mounting portion 28 of the spindle. In this manner, the swivel head 26–26' of the spindle is maintained in its seat 27–27'.

From the foregoing it will be noted that although the tubular housing 23 is rigidly connected to the base 16, the mounting spindle 25 although not strictly speaking pendently suspended, it is swivelly mounted for movement in any angular direction off of the axis $a$ of the housing for reasons later to become apparent.

In the present disclosure, the optical unit 21 is shown as comprising an optical scope 35 having an ocular lens system 36 at right angles with respect to an objective lens system 37; bulls eye bubble unit 38 related to the right angled lens system; and a mounting sleeve 39 axially aligned with axial center $o$ of the objective lens system for mounting the optical unit 21 upon the mounting spindle 25 of the adapter. Although the lens systems are shown at right angles with respect to each other it will be appreciated that the angle of incidence between these lenses may be varied as necessity requires.

Structurally the optical unit 21 includes a main body 40 housing a prism or mirror 41 at the juncture of the lens system 36 and 37. This body 40 has a flat upper surface 42 in spaced relation and normal to the axis of the objective lens system 37. A shoulder 43 is formed on the surface 42 concentric to the axis of the objective lens system 37. The mounting sleeve 39 extends upwardly from the shoulder 43 and is integral therewith as an extension from the housing 40. The sleeve 39 is aligned co-axially with the objective lens system 36. The sleeve 39 is bored to have sliding fit upon the mounting portion 28 of the mounting spindle 25 for axial alignment therewith. The outer surface of the sleeve 39 has an annular groove 44 adjacent its tapered open upper end 45 to receive a locking means 46.

The locking means 46 as best seen in FIGS. 3, 5 and 7 include a pair of diametrically opposed round head studs. Each pair of studs consists of a spring loaded plunger 47 and a microadjustable screw 48 diametrically opposite each other. These pairs of studs are set at right angles to each other to traverse the axis $a$ of the tubular housing 23 so that the rounded head of each stud faces center. When the micro-adjustable screws 48 are withdrawn slightly from center, the diametrically opposed spring loaded plungers 47 are urged inwardly toward the enlarged mounting portion 28 of the spindle 25. However, when the tapered end 45 of the sleeve 39 engages the rounded heads of the studs, the spring loaded plungers 47 are urged outwardly until they enter the annular groove 44 in snap-like action. The rounded heads on the screws 48 thereby receive the grooved portion 44 of the sleeve to resist further expansion of the springs behind the plungers 47. The sleeve 39 is locked in detachable relation to the spindle 25 and will be supported by the same until pulled therefrom intentionally by a manual force overcoming the action of the spring loaded plungers 47.

It should here be noted that the same detachable relation between the spindle and optical unit 21 can be accomplished by making the spindle a sleeve slidably mountable on a solid rod extending upwardly from the body 40 of the optical unit and in axial alignment with the axis $o$ of the objective lens 37.

The optical unit 21 is now in operative relation to the adapter 20 and the axis $o$ of the objective lens system 37 radially disposed relative to the center of the swivel head 26 or 26' which is fixed relative to the center $c$ of the base 16 of the instrument 11. The optical plumb 10 is now related to the instrument such as to establish vertical disposition of the center $c$ directly above a mark or nail on the surface supporting the tripod 12.

True vertical of the optical plumb 10 is established by the bulls eye type bubble unit 38 which is mounted on the housing 40 of the optical unit 21. In the present disclosure the bubble unit 38 comprises a sealed unit 50 (FIG. 4) mounted on a compression spring 51 within a recess 52 formed in a base or arm 53 which extends radially from the housing 40 above the ocular lens system 36. The arm 53 may be formed as a part of the housing 40 above the ocular lens system 36. The arm 53 may be formed as a part of the housing 40 or as a separate unit having a lower surface milled to fit flush against the upper surface 42 of the housing and having a bore 54 to fit the shoulder 43 and the adjacent portion of the sleeve 39.

The optical plumb 10 as shown in the instant drawings is shop tested to dispose the axis of the ocular lens system horizontal and the objective lens system vertical when the bubble $b$ in the bubble unit coincides with the bulls eye circle $c$ scribed on the glass top of the sealed bubble unit 50 (FIG. 6). Suitable screws 55 extend through an annular escutcheon plate 56, the inner ring of which bears over the sealed unit 50 to press the latter down against the action of the spring 51 in the recess 52. The screws 55 are threaded into the arm 53 and are factory adjusted to accurately set the body of the bubble unit 38 relative to the optical unit 21. In this manner the vertical axis of the bubble and circle $c$ is set parallel to the vertical axis of the objective lens system.

The instrumentman first makes the normal set up of the tripods and surveying instrument. He then notes the position of the bubble $b$ on the sealed unit 50. If it is not on the bulls eye circle $c$, the micro-adjustable screws 48 must be manipulated until the bubble $b$ centers on the circle $c$. In this manner, the axis of the plunger 25 and that $o$ of the objective lens system 37 is caused to assume true vertical. Now, by sighting through the ocular lens system, the instrumentman can check whether the cross hairs $h$ therein are centered relative to a benchmark, stake or nail, the image of which is projected on a vertical line of sight $v$ up through the objective lens system 37 to the prism 41. By rotating the optical plumb unit about the spindle 25 and checking the relation of the image on a fixed point or stake to the cross hairs, the accuracy of plumb can be checked to verify whether or not there is any discrepancy at any angle. Once plumb is established directly over a bench-mark or like locating means, a reading by the telescope of the theodolite can be made to establish a new mark at a distant point or location. A flag or target then can be set on the base 16 in place of the theodolite T and the optical unit 21 removed from the adapter for use on another tripod at another point or the new location.

The optical unit 21 of the plumb 10 can be used in other situations to establish plumb. For example, the unit 21 can be mounted on a projection of a structure, say at roof or a high floor level. With the bulls eye bubble unit 38 reading properly, a sighting through the ocular lens system 37 can be used to sight the image of a mark vertically below with assurance that the latter is plumb with respect to the location of the optical plumb 10.

While I have described the optical plumb of the present invention in specific detail it will be appreciated by those skilled in the art that the same may be susceptible to variations, alterations and/or modifications without departing from the spirit or scope of my invention therein. I therefore desire to avail myself of all variations, alterations and/or modifications as may fairly come within the purview of the appended claims.

What is claimed is:

1. An optical plumb for establishing true vertical disposition of a levelable base of a tripod supported instrument above a centering location mark on a surface comprising:

(a) a tubular housing having a swivel seat formed in its upper end;

(b) means for fixedly securing the upper end of said tubular housing to and with its swivel seat at the center of said base and with said tubular housing extending substantially vertically downward therefrom;

(c) a mounting spindle having a head end swivelly mounted in said swivel seat to afford swinging movement of the lower end of said spindle relative to and within said fixed tubular housing;

(d) an optical unit including a main body having an objective lens system and an ocular lens system at an angle relative to each other for sighting such centering location mark;

(e) means on said main body for establishing true vertical to the objective lens of said optical unit;

(f) a mounting sleeve extending upwardly from said main body in axial alignment with the objective lens of said optical unit for sliding fit upon the lower end of said mounting spindle; said mounting sleeve being of lesser diameter than the inner diameter of said tubular housing for swinging movement within the latter with said mounting spindle to thereby establish true vertical thereof relative to said levelable base; and (g) means on said tubular housing for releasably engaging said mounting sleeve and for positioning the latter vertically and in suspended relation co-axially with and on said mounting spindle.

2. The device in accordance with claim 1 wherein the means for establishing true vertical to the objective lens of said optical unit includes:

(a) a bubble level mounted on said optical unit with its vertical axis parallel to the axis of the objective lens system, and wherein said means on said tubular housing for releasably engaging said mounting sleeve for positioning the latter vertically and in suspended relation co-axially with and on said mounting spindle comprises:

(b) a plurality of sets of spring loaded radially extending plungers and diametrically opposed microthreaded screws on said tubular member for engaging said mounting sleeve when the latter is mounted on said mounting spindle.

3. The device in accordance with claim 2 in which said mounting sleeve has a tapered upper end and an annular groove formed adjacent the same for snap action engagement with said spring laoded plungers.

4. The device in accordance with claim 1 wherein:

(a) said tubular housing has an annular shoulder formed therein adjacent the upper end of said housing beneath said swivel seat formed thereon at the center of said base, (b) said mounting spindle having an upper portion of reduced diameter extending through said annular shoulder and terminating in a head swivelly mounted in said swivel seat, (c) spring means on the reduced upper portion of said mounting spindle and between and engaging the spindle and the annular shoulder in said tubular housing for maintaining the head on the upper portion of said spindle on said swivel seat, (d) said means for establishing true vertical to said objective lens including a bubble level mounted on said optical unit with its vertical axis parallel to the axis of the objective lens system, and (e) said means for releasably engaging and positioning said mounting sleeve vertically within said tubular member comprising a plurality of sets of spring loaded radially extending plungers and diametrically opposed threaded screws on said tubular member having their inner ends disposed to peripherally engage said mounting sleeve when the latter is mounted on said mounting spindle.

5. The device in accordance with claim 4 in which said mounting sleeve has a tapered upper end for sliding fit past the inner ends of said spring loaded plungers and diametrically opposed threaded screws.

6. The device in accordance with claim 5 in which said mounting sleeve has an annular groove adjacent the base of the tapered end of said sleeve for receiving and releasably engaging the inner ends of said spring loaded plungers and diametrically opposed threaded screws.

References Cited
UNITED STATES PATENTS

| | | | |
|---|---|---|---|
| 755,325 | 3/1904 | Sontar | 285—317 |
| 780,397 | 1/1905 | Whitney | 88—2.2 |
| 928,477 | 7/1909 | Sloggett | 88—2.3 |
| 2,679,181 | 5/1954 | Keuffel et al. | 88—2.3 |

JEWELL H. PEDERSEN, Primary Examiner

ORVILLE B. CHEW II, Assistant Examiner

U.S. Cl. X.R.

33—46, 73; 356—250